United States Patent [19]

Radford

[11] Patent Number: 4,587,088
[45] Date of Patent: May 6, 1986

[54] COATING A NUCLEAR FUEL WITH A BURNABLE POISON

[75] Inventor: Kenneth C. Radford, Irwin, Pa.

[73] Assignee: Westinghouse Electric Corp., Pittsburgh, Pa.

[21] Appl. No.: 526,712

[22] Filed: Aug. 26, 1983

[51] Int. Cl.$^4$ ............................................. G21C 3/00
[52] U.S. Cl. .................................. 376/419; 376/414; 376/421; 427/6
[58] Field of Search ............... 376/419, 414, 421, 422; 427/5, 6, 49, 327, 328

[56] References Cited

U.S. PATENT DOCUMENTS

| | | | |
|---|---|---|---|
| 3,427,222 | 2/1969 | Biancheria | 376/419 |
| 4,209,375 | 6/1980 | Gates | 204/192 R |
| 4,279,700 | 7/1981 | Boyle | 376/418 |

FOREIGN PATENT DOCUMENTS 1587354  3/1970  France .

OTHER PUBLICATIONS

Lyman, T.; Metals Handbook, 8th Ed., vol. 2, American Society for Metals, Metals Park, Ohio.

Primary Examiner—Donald P. Walsh
Attorney, Agent, or Firm—D. E. Erickson

[57] ABSTRACT

A method for coating a nuclear fuel with a burnable poison and a burnable poison coated nuclear fuel made by the method. The nuclear fuel is surface cleaned, and then a burnable poison layer is sputtered thereon. A sputtering deposition rate is picked that preferably will heat the nuclear fuel surface between 200° C. and 600° C. For deposition rates that result in heating the nuclear fuel surface to less than 200° C., external heat is applied to heat the nuclear fuel surface between 200° C. and 600° C. To make the burnable poison layer less hygroscopic, an overcoat layer of a hydrophobic material is sputtered on the burnable poison layer.

11 Claims, 4 Drawing Figures

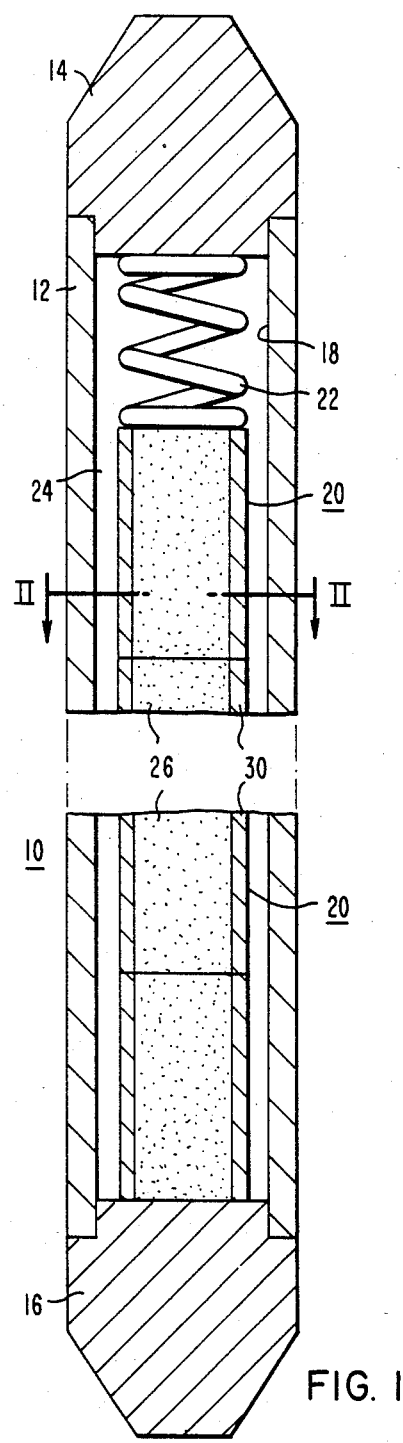
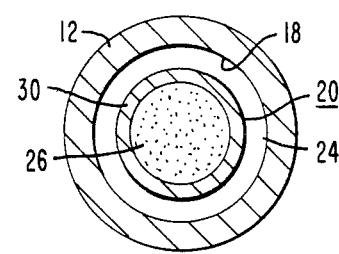
FIG. 1
FIG. 2

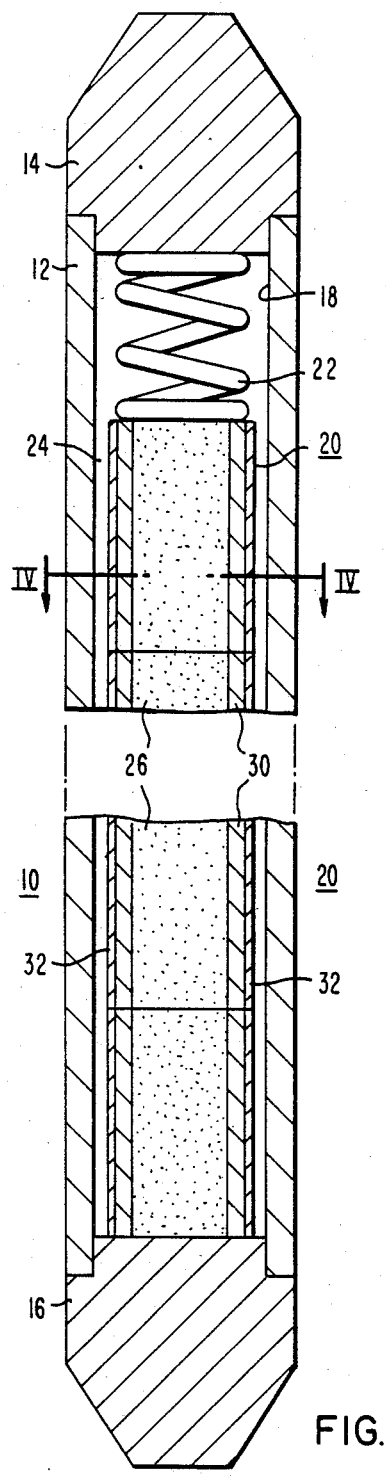
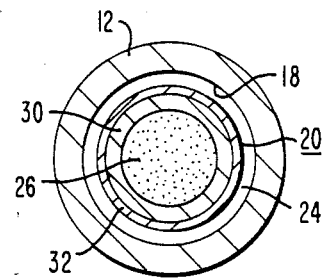
FIG. 4
FIG. 3

COATING A NUCLEAR FUEL WITH A BURNABLE POISON

BACKGROUND OF THE INVENTION

The present invention relates generally to burnable poisons (also called burnable absorbers) for nuclear reactors and, more particularly, to an improved method for coating a nuclear fuel with a burnable poison and to a nuclear fuel coated with a burnable poison by the method of the invention.

It is known that nuclear fuel may have various shapes such as plates, columns, and even fuel pellets disposed in end-to-end abutment within a tube or cladding made of a zirconium alloy or stainless steel. The fuel pellets contain fissionable material, such as uranium dioxide, thorium dioxide, plutonium dioxide, or mixtures thereof. The fuel rods are usually grouped together to form a fuel assembly. The fuel assemblies are arranged together to constitute the core of a nuclear reactor.

It is well known that the process of nuclear fission involves the disintegration of the fissionable nuclear fuel material into two or more fission products of lower mass number. Among other things the process also includes a net increase in the number of available free neutrons which are the basis for a self-sustaining reaction. When a reactor has operated over a period of time the fuel assembly with fissionable material must ultimately be replaced due to depletion. Inasmuch as the process of replacement is time consuming and costly, it is desirable to extend the life of a given fuel assembly as long as practically feasible. For first time fueling and subsequent refueling of a thermal reactor, deliberate additions to the reactor fuel of parasitic neutron-capturing elements in calculated small amounts to compensate for initial higher reactivity may lead to highly beneficial effects. Such neutron-capturing elements are usually designated as burnable poisons (or burnable absorbers) if they have a high probability (or cross section) for absorbing neutrons while producing no new or additional neutrons or changing into new poisons as a result of neutron absorption. During reactor operation the burnable poisons are progressively reduced in amount so that there is a compensation made with respect to the concomitant reduction in the fissionable material.

The life of a fuel assembly may be extended by combining an initially larger amount of fissionable material as well as a calculated amount of burnable poison. During the early stages of operation of such a fuel assembly, excessive neutrons are absorbed by the burnable poison which undergoes transformation to elements of low neutron cross section which do not substantially affect the reactivity of the fuel assembly in the latter period of its life when the availability of fissionable material is lower. The burnable poison compensates for the larger amount of fissionable material during the early life of the fuel assembly, but progressively less burnable poison captures neutrons during the latter life of the fuel assembly, so that a long life at relatively constant fission level is assured for the fuel assembly. Accordingly, with a fuel assembly containing both fuel and burnable poison in carefully proportioned quantity, an extended fuel assembly life can be achieved with relatively constant neutron production and reactivity.

Burnable poisons which may be used include boron, gadolinium, samarium, europium, and the like, which upon the absorption of neutrons result in isotopes of sufficiently low neutron capture cross section so as to be substantially transparent to neutrons.

The incorporation of burnable poisons in fuel assemblies has been recognized in the nuclear field as an effective means of increasing fuel capacity and thereby extending core life. In U.S. Pat. No. 3,427,222 a boron-containing burnable poison layer is fusion bonded to the surface of a nuclear fuel pellet substrate. Such existing techniques for coating nuclear fuel substrates with burnable poisons have problems with the adherence of the coating and with the control of the coating thickness. For boron-containing burnable poisons, existing coating techniques usually require high temperatures well over 600° C.) with the result that cooldown creates substantial strains at the coating-pellet interface due to thermal expansion differences resulting in fracture and hence poor adhesion. Other problems include chemical incompatibility at the coating temperatures resulting in either pellet or coating deterioration.

Conventional coating techniques used in non-nuclear applications have included sputtering. Sputtering is not a fusion bonding process. In U.S. Pat. No. 4,209,375 wear resistant coatings (including boron-containing materials) were sputtered on tool steel cutting tools to be used in abrasive environments. In sputtering, a film of the target material is deposited on the substrate. During the sputtering process, a high voltage electric field is applied between the cathode target and an anode in a vacuum chamber containing a low pressure inert gas (such as argon). The potential causes gas ions to strike the cathode target dislodging target atoms and molecules, some of which impinge on, and adhere to, the substrate.

Fuel pellets coated with a boron containing burnable poison such as elemental boron, boron-10 isotope (the isotope of elemental boron having the burnable poison property), zirconium diboride, boron carbide, boron nitride, and the like suffer from varying degrees of moisture adsorption. For example, uranium dioxide fuel pellets coated with zirconium diboride, after manufacture, must be furnace dried in a time consuming operation and then loaded into the fuel rods in a low humidity glove box environment.

SUMMARY OF THE INVENTION

Briefly stated, the invention is directed towards a method for coating a nuclear fuel with a burnable poison. The nuclear fuel is surface cleaned, and then a burnable poison layer is sputtered thereon.

In one embodiment of the method, a sputtering deposition rate is picked that will heat the nuclear fuel surface to less than 200° C. and heat is externally applied to maintain the nuclear fuel surface between 200° C. and 600° C.

In a preferred embodiment of the method, a sputtering deposition rate is picked that will heat the nuclear fuel surface between 200° C. and 600° C.

The invention also is directed towards a burnable poison coated nuclear fuel made by the preferred method of the previous paragraph in which the nuclear fuel includes uranium dioxide and the burnable poison includes a boron-containing material.

In one example of the preferred method of the second previous paragraph, a zirconium non-hygroscopic overcoat layer likewise is sputtered on the burnable poison layer.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may best be understood by reference to the following description taken in connection with the accompanying drawings, in which:

FIG. 1 is a longitudinal sectional view of a fuel rod containing burnable poison sputter coated fuel pellets.

FIG. 2 is a transverse sectional view along the line II—II of FIG. 1.

FIG. 3 adds a sputtered zirconium non-hygroscopic overcoat layer to the fuel pellets of the fuel rod of FIG. 1.

FIG. 4 is a transverse sectional view along the line IV—IV of FIG. 3.

DETAILED DESCRIPTION OF THE INVENTION

Nuclear fuel includes uranium in the form of uranium dioxide pellets each having a generally cylindrical configuration with an approximately one-third inch diameter and an approximately one-half inch length. Desirable boron-containing burnable poison coating thicknesses on the fuel pellets correspond to a target boron-10 loading of generally 1.5 mg per lineal inch.

Applicant's invention permits a burnable poison coated nuclear fuel to be manfactured with improved adherence of the burnable poison layer to the nuclear fuel substrate and with improved control of the thickness of the burnable poison coating. In applicant's invention, as seen in FIGS. 1 and 2, a fuel rod 10, for use in a nuclear reactor fuel assembly, includes an elongated tube 12 having a top end plug 14 and a bottom end plug 16 providing an enclosed chamber 18 in which a plurality of fissionable fuel pellets 20 are placed in end-to-end abutment biased against the bottom end plug 16 by the action of a spring 22. The pellet 20 diameter is slightly less than that of the tube 12 and forms a clearance space 24. Both the spring 22 and clearance space 24 accommodate any thermal expansion of the pellets 20 during operation.

Preferably the fissionable body portion or substrate 26 of the fuel pellet 20 consists essentially of uranium dioxide, although other forms of uranium (like uranium carbide), as well as plutonium or thorium, or mixtures thereof, may be used. Also, preferably the burnable poison layer 30 covering at least a part of the substrate 26 consists essentially of boron, boron carbide, boron nitride, or especially zirconium diboride, although other forms of boron, as well as gadolinium, samarium, europium, and the like, may be used.

The method of the invention for coating a nuclear fuel with a burnable poison includes the step of surface cleaning at least a part of the nuclear fuel substrate 26, followed by the step of sputtering a burnable poison layer 30 on at least a part of the cleaned substrate. It was found that a sputtered coating 30 would adhere poorly to the substrate 26 unless the substrate 26 first was surface cleaned, especially to remove the dust generated during the surface grinding operation used to size the fuel pellet. Pellet grinding is a normal sizing operation, but interestingly, poor adhesion was observed when sputtering was tried on unground pellets. It also was found that the sputtering process itself heats the surface of the nuclear fuel substrate 26. It was discovered that when low sputter deposition rates were chosen, where the sputtering itself heated the substrate's 26 surface to a generally steady-state temperature of less than about 200° C., the burnable poison layer 30 was not as adherent as desired, but that good bonding could be achieved by applying heat (external to the sputtering process) to the nuclear fuel substrate 26 during sputtering to sustain its surface temperature between about 200° C. and about 600° C. For generally cylindrically shaped nuclear fuel pellet substrates 26 of uranium dioxide and for a zirconium diboride burnable poison with a chosen sputter deposition rate of generally $2.09 \times 10^{-3}$ mils per hour, it was found that external heat should be applied to sustain the nuclear fuel surface at a desired temperature of about 400° C. during sputtering.

It was discovered that adherent coatings also could be achieved by choosing a high sputter deposition rate, one which itself would heat the substrate's 26 surface to a generally steady state temperature of between about 200° C. and about 600° C. Of course external heat also could be applied, during sputtering, to the substrate's 26 surface if the high sputter deposition rate did not itself achieve some preselected substrate surface temperature between 200° C. and 600° C. It was found that there is a tendency for burnable poison coatings to spall after deposition when the coated nuclear fuel cools down to room temperature if the coating was applied at a substrate surface temperature exceeding about 600° C. The poor adhesion of the burnable poison layer 30 to the nuclear fuel substrate 26 should be found with above 600° C. deposition temperatures whether the coatings were applied by prior art techniques (such as fusion bonding) or whether the coatings were achieved by sputtering (where the sputter deposition rate and/or applied heat caused the above 600° C. temperature).

It is preferable, in all embodiments of the method of the invention, that the nuclear fuel substrate 26 include generally cylindrically-shaped uranium dioxide pellets. As the pellet substrates 26 are to be placed in end-to-end abutment in the fuel rod 10, it is desirable that the burnable poison layer 30 be sputtered generally only on the circumference of the pellet substrates 26. It also is preferable that the burnable poison layer 30 include a boron-containing material, and zirconium diboride is a first choice. For embodiments of the method of the invention not applying external heat to the substrate's 26 surface, an exemplary chosen deposition rate is generally $2.93 \times 10^{-1}$ mils per hour.

It has been found that moisture adsorption by hygroscopic burnable poison coatings may be reduced by overcoating with a layer of a non-hygroscopic (hydrophobic) material. A preferred choice is a zirconium overcoat 32 sputtered on a zirconium diboride burnable poison layer 30. The zirconium overcoat 32 should be applied generally immediately after the zirconium diboride layer 30 is applied, before the hygroscopic burnable poison 30 has been exposed to air to avoid trapping any moisture in the fuel pellet 20. As with burnable poison coatings, it is preferred that a zirconium overcoat sputtering deposition rate be selected that will heat the surface of the nuclear fuel to a steady state temperature between about 200° C. and about 600° C.

EXAMPLE

A conventional low deposition rate sputtering unit was used for a first set of sputtering experiments for applying thin uniform coatings of burnable poisons on nuclear fuel pellets. This unit was operated with an initial vacuum of $4$–$6\times10^{-7}$ torr which was reduced to $8$–$10\times10^{-3}$ torr with a small Ar flow prior to sputtering the samples. The circular specimen holder was located directly beneath a 6 inch target of burnable poison coating material which was activated by an RF power supply operating at a voltage of 1–3 KV, and a total power of ~480 W.

For the first set of sputtering experiments, $\frac{1}{4}$ inch thick hot pressed plates of B, $B_4C$, BN and $ZrB_2$ were bonded to water cooled Cu blocks. The pellets were cleaned before being coated to insure good adhesion. A preferred cleaning technique is ultrasonic cleaning in water followed by drying. The samples to be coated then were stood on end about 4 inch below the target in the vacuum chamber, spaced apart on another Cu block. Each pellet was covered with a ceramic disc of the same diameter as the pellet to prevent end coating. Except for the initial two runs, the support plate was electrically heated to 350°–400° C., with the temperature measured with a thermocouple. The target first was cleaned of adsorbed contaminants (e.g. $CO_2$, $H_2O$, etc.) by sputtering with the shutter closed. The shutter was opened and deposition continued for half the total coating time whereupon the voltage was turned off, the system brought to atmospheric pressure, and the samples turned over so that the opposite end was located on the Cu specimen holder (without pellet inversion, tapered coatings would result). The ceramic disc covers were repositioned and the same procedures followed for an additional, approximately equal coating time.

In the case of BN, due to the volatility of nitrogen, a back pressure of $8$–$10\times10^{-3}$ torr of nitrogen gas was used instead of Ar to prevent nitrogen loss during deposition of the coating.

The coating time is determined by the thickness required and the deposition rate. The deposition rate depends on the power input to the target and is predetermined by experiment. Coating thicknesses can be very accurately controlled because sputtering is a relatively slow process. The initial experiments gave the following deposition rates.

For BN the rate was $6.8\times10^{-3}$ mils/hr; a time of 30.7 was required for a thickness of 0.21 mils.

For $B_4C$ the rate was $4.3\times10^{-3}$ mils/hr; a time of 23.3 hrs was required for a thickness of 0.10 mils.

For $ZrB_2$ the rate was $9.5\times10^{-3}$ mils/hr; a time of 17.86 hrs was required for a thickness of 0.17 mils.

For B the rate was $5.7\times10^{-3}$ mils/hr; a time of 14.04 hrs was required for a thickness of 0.08 mils.

Boron loadings were determined by weight change methods (measuring the weight of the pellet before and after coating with the known boron-containing burnable poison BN, $B_4C$, $ZrB_2$ or B), some of which were checked by chemical analysis.

The sputtering experiments for the initial two runs were performed with approximately 20 (total) pellets of depleted $UO_2$ located on the 6 inch diameter specimen holder in a manner that the effects of interpellet distance could be evaluated. The samples were not deliberately heated, although the act of sputtering at a low deposition rate raises the pellet temperature to the 150°–200° C. range. A partially masked glass slide was included to establish the material deposition rate, and the coating thickness was measured with a conventional instrument capable of very high resolution in the Angstrom range.

The cold (as opposed to heated) sputtering runs with $B_4C$, $ZrB_2$ and BN targets successfully deposited coatings and showed that interpellet distances of $\frac{1}{2}$ inch or greater did not influence the deposition thickness. However, the outer layer of pellets had to be placed within a circle of approximately 5 inch diameter to obtain a reasonably uniform coating, even though the target diameter was 6 inches. The $B_4C$ coating exfoliated with application of solvent—either acetone or water—in the form of very fine flakes. Although this did not occur with the $ZrB_2$ coating, this latter coating did not survive a test of 10 thermal cycles to 600° C. Only the BN coating survived both a peel test using adhesive tape and the thermal cycling. In the adhesive tape peel test, the tape was pressed firmly onto the circumference of the pellets and then removed. The tape is then inspected for evidence of coating removal. In the thermal test, the pellets are thermally cycled from room temperature to 600° C. ten times over a period of 6 hours and then inspected for evidence of coating removal.

Evaluation of the step height of the coating on the glass slide showed that in a vertical direction the coating formed a thicker layer closest to the target and tapered significantly towards the specimen holder by a factor of 7 over a 1 inch distance. Also, deposition on a horizontal surface was ~1.4 times greater than the maximum vertical deposition. It was clear that the pellets would have to be inverted to produce a uniform film along the length. It was also found that pellets in an inner ~3 inch diameter circle showed thicker coatings than in the outer 2 inch diameter ring, which required that during inversion, the inner and outer pellets be interchanged.

Because of the less than desired adhesion of the $ZrB_2$ and $B_4C$ results, more experiments were initiated using a small, $3\times3$ inch Cu block heated with an immersion heater to ~400° C. Coatings of $ZrB_2$, B and $B_4C$ were applied on depleted $UO_2$ pellets with good success. All the coatings survived the adhesive tape peel test and the 10 thermal cycles to 600° C.

A second set of sputtering experiments used a high deposition rate sputtering unit (~$2.93\times10^{-1}$ mils per hour for zirconium diboride) which resulted in adherent coatings without the need to apply external heat to the pellet holder during sputtering, as had been required when using the lower deposition rate sputtering unit of the previous set of sputtering experiments.

In a third set of experiments, a low deposition rate sputtering unit was used with a $ZrB_2$ target and a Zr target to coat the pellet first with a $ZrB_2$ burnable poison layer and then to overcoat with Zr. This was done with both targets enclosed in the vacuum chamber, with the pellets heated, and without exposure to ambient between the two depositions. The $ZrB_2$ was deposited at $2.09\times10^{-3}$ mils/hr for 117 hours, and the Zr thereafter was deposited at $1.15\times10^{-2}$ mils/hr for 21.75 hours.

Typically, the invention is used to circumferentially surround (i.e., coat only the cylindrical wall of) the fuel pellet substrate 26 with a burnable poison layer 30 and with the optional overcoat layer 32. However, in some applications it may be desirable to coat the entire fuel pellet substrate 26, including its top and bottom surfaces. In other applications, it may be advantageous to coat only a part of the nuclear fuel substrate with the burnable poison layer and then generally cover (or partially cover) the burnable poison layer with the overcoat layer. Also, where substrates, burnable poison layers, and overcoats may contain uranium dioxide, zirconium diboride, and zirconium, respectively, it is preferred that they respectively consist essentially of such uranium dioxide, zirconium diboride, and zirconium.

It will be apparent that many modifications and variations are possible in light of the above teachings. It, therefore, is to be understood that within the scope of the appended claims, the invention may be practiced other than as specifically described.

I claim:

1. A method for coating a nuclear fuel with a burnable poison, comprising:
   (a) cleaning at least a section of the surface of said nuclear fuel;
   (b) choosing a burnable poison sputtering deposition rate that will heat the surface of said nuclear fuel to a generally steady-state temperature less than about 200° C.;
   (c) sputtering, at said chosen deposition rate, a layer of said burnable poison on at least a portion of said cleaned section of said nuclear fuel; and
   (d) applying heat, during sputtering, to said nuclear fuel to maintain its surface temperature between about 200° C. and about 600° C.

2. The method of claim 1 wherein said nuclear fuel comprises uranium dioxide pellets having a generally cylindrical shape, said burnable poison comprises zirconium diboride, said chosen deposition rate is generally $2.09 \times 10^{-3}$ mils per hour, and said applying heat maintains the surface temperature of said nuclear fuel at about 400° C.

3. A method for coating a nuclear fuel with a burnable poison, comprising:
   (a) cleaning at least a section of the surface of said nuclear fuel;
   (b) choosing a burnable poison sputtering deposition rate that will heat the surface of said nuclear fuel to a generally steady-state temperature between about 200° C. and about 600° C.; and
   (c) sputtering, at said chosen deposition rate, a layer of said burnable poison on at least a portion of said cleaned section of said nuclear fuel.

4. The method of claim 3 also including:
   (d) applying heat, during sputtering, to said nuclear fuel to generally maintain its surface temperature at a preselected temperature between about 200° C. and about 600° C., when said chosen deposition rate alone will heat the surface of said nuclear fuel to a temperature less than said preselected temperature.

5. The method of claim 3, wherein said nuclear fuel comprises uranium dioxide pellets having a generally cylindrical shape.

6. The method of claim 5 wherein said sputtering sputters said burnable poison layer generally only on the circumference of said pellets.

7. The method of claim 5, wherein said burnable poison comprises a boron-containing material.

8. The method of claim 7, wherein said boron-containing material comprises zirconium diboride.

9. The method of claim 8, wherein said chosen deposition rate is generally $2.93 \times 10^{-1}$ mils per hour.

10. The method of claim 8, also including:
    (d) selecting a zirconium sputtering deposition rate that will heat the surface of said nuclear fuel to a generally steady-state temperature between about 200° C. and about 600° C.; and
    (e) sputtering, at said selected deposition rate, a hydrophobic overcoat layer of zirconium on said burnable poison layer generally immediately after sputtering said burnable poison layer on said nuclear fuel.

11. A burnable poison coated nuclear fuel, comprising:
    (a) a uranium dioxide containing substrate; and
    (b) a boron containing burnable poison layer deposited on said substrate by sputtering at a deposition rate that will heat the surface of said substrate to a generally steady-state temperature between about 200° C. and about 600° C.

* * * * *